United States Patent
Makkapati et al.

(10) Patent No.: US 7,268,725 B2
(45) Date of Patent: Sep. 11, 2007

(54) RADAR SCAN CONVERSION FOR PLAN POSITION INDICATOR

(75) Inventors: Vishnu V. Makkapati, Ongole (IN); Pravas R. Mahapatra, Bangalore (IN)

(73) Assignee: Honeywell International Inc., Morristown, NJ (US)

(*) Notice: Subject to any disclaimer, the term of this patent is extended or adjusted under 35 U.S.C. 154(b) by 183 days.

(21) Appl. No.: 11/227,461

(22) Filed: Sep. 15, 2005

(65) Prior Publication Data
US 2007/0164899 A1 Jul. 19, 2007

(51) Int. Cl.
G01S 7/04 (2006.01)
(52) U.S. Cl. ................................................ 342/185
(58) Field of Classification Search ............... 342/176, 342/185, 195
See application file for complete search history.

(56) References Cited

U.S. PATENT DOCUMENTS

| | | | |
|---|---|---|---|
| 4,002,827 A * | 1/1977 | Nevin et al. ............... | 342/185 |
| 4,547,803 A * | 10/1985 | Richards ................... | 348/442 |
| 4,697,185 A | 9/1987 | Thomas et al. | |
| 4,931,801 A | 6/1990 | Hancock | |
| 5,036,326 A | 7/1991 | Andrieu et al. | |
| 5,519,401 A * | 5/1996 | Farmer et al. ............. | 342/185 |
| 5,530,450 A * | 6/1996 | Sohn et al. ................. | 342/185 |
| 5,554,992 A * | 9/1996 | Toth et al. ................. | 342/185 |
| 5,742,297 A | 4/1998 | Logan | |
| 6,064,388 A * | 5/2000 | Reyzin ...................... | 345/418 |
| 6,140,955 A * | 10/2000 | Andrusiak et al. ......... | 342/185 |
| 6,211,814 B1 | 4/2001 | Benjamin et al. | |
| 6,415,046 B1 * | 7/2002 | Kerut, Sr. .................. | 382/128 |

OTHER PUBLICATIONS

Doviak, R. J., et al., "Table of Contents", *Doppler Radar and Weather Observations*, 2nd Edition, San Diego, CA: Academic Press,(1993).

Mahapatra, P. R., et al., "Table of Contents", *Aviation Weather Surveillance System: Advanced Radar and Surface Sensors for Flight Safety and Air Traffic Management*, London, UK: IEE Press,(1999).

Watson, R., et al., "Combining ground based meteoriligical radar data from multiple overlapping sites", *Proc. International Geoscience and Remote Sensing Symposium*, 3, Italy,(Jul. 1995), 1660-1662.

Zhang, J., et al., "Three-dimensional gridding and mosaic of reflectivities from the multiple wsr-88d radars", *Proc. 30th International Conference on Radar Meteorology*, Munich, Germany,(Jul. 2001),719-721.

* cited by examiner

*Primary Examiner*—John B. Sotomayor (57) ABSTRACT

An angular scan interval may be divided into one or more sweep sectors for display. Polar $(r, \theta)$ coordinates may be calculated for rectangular $(x, y)$ coordinates at each pixel of a display interval by computing polar $(r, \theta)$ coordinates in an interval of 0 to $\pi/4$ and by applying mapping equation sets. Bounds of a block of polar radar $(\mathcal{R}, \Theta)$ coordinates that map to a given $(x, y)$ coordinate may be computed. A mechanism to associate the bounds of the block in polar radar $(\mathcal{R}, \Theta)$ coordinates and the rectangular $(x, y)$ coordinates may be created. Bounds associated with the x-coordinate in a sweep sector may be calculated. A maximum of the x-coordinate bounds to $x_{max}$ and a minimum to $x_{min}$ may be assigned accordingly. Bounds associated with the y-coordinate in the sweep sector may be calculated for each x-coordinate. A maximum of the bounds of the y-coordinate to $y_{max}$ and a minimum to $y_{min}$ may be assigned accordingly. Bounds of the block of polar radar $(\mathcal{R}, \Theta)$ coordinates for each rectangular $(x, y)$ coordinate computed from the mechanism may be retrieved. Radar observed parameter values scanned within the corresponding retrieved block bounds may be retrieved. Average or maximum parameter values within the block on the display may be displayed at the rectangular $(x, y)$ coordinate.

29 Claims, 7 Drawing Sheets

RADAR SCAN CONVERSION FOR PLAN POSITION INDICATOR

BACKGROUND

Efficient and accurate data presentation format for radars is often sought. A rotating antenna of a radar transmits pulses at regular intervals. A radar receiver converts the reflected pulses, or "returns" and displays them on a circular-shaped area on a monitor or display. This display is known as Plan Position Indicator (PPI) and gives the plan view of the distribution of radar scatterer parameters in an area around the antenna. PPI may, for example, be suitable for observing the evolution of weather phenomena including fast-developing phenomena.

Radar scan data may be converted to a 2-D format appropriate for presentation in polar coordinates with respect to a radar location. In a centered PPI mode, the antenna location is mapped at the center of the circular area of the display. In an offset PPI mode, the antenna location is represented at an offset from the center of the display area. The offset may be in an x-direction or y-direction or both x- and y-directions.

An analog PPI display includes a bright radial line, made visible due to bombardment of electron beam on the phosphor coating on a cathode ray tube (CRT), rotated around the circular face of CRT. Due to its persistence property, the phosphor coating continues to emit light for a few seconds after being activated. The entire display is refreshed by a next cycle of bombardment of electron beam. The PPI display is refreshed once per revolution of the radar antenna, and depends on the revolution rate of the radar antenna.

Radar spoking includes periodic flashes of the rotating time base or sweep on a radial display. The radar spoking may be caused by mutual interference or jamming.

A Liquid Crystal Display (LCD) monitor used for the PPI display utilizes the characteristics of crystals when electricity is applied to them. A matrix of these crystals constitutes the display, in which colors can be turned on or off by the application of current. The LCD monitor may consume less energy, and less physical space compared to a CRT display monitor. The resolution of LCD screens may be fixed, wherein the number of pixels that can be displayed on LCD monitor depends on the number of crystals of the matrix.

Near the radar site there is often ground clutter. Ground clutter may be substantially removed by using appropriate electronic filters. However, such filters may also remove parts of desirable signals. In the beam with the lowest elevation angle, PPI clutter is often so strong that filtering also removes useful signals resulting in a gap. For PPI scanning at higher elevation angles, the beam may overshoot precipitation, partly or totally, and thereby not detect the precipitation.

DETAILED DESCRIPTION

An embodiment of a method described herein determines display coordinates of radar scan data that may be adjusted to a display resolution and/or to a radar resolution, resulting in accurate and computationally efficient radar data displays. Embodiments describe a process in which an angular scan interval may be divided for display purposes into one or more sectors depending on the desired smoothness of Plan Position Indicator (PPI) data display. A reverse scan conversion may be carried out to obtain display polar coordinates (r, θ) associated with each Cartesian display coordinate pixel (x, y) within the angular scan interval. Mapping is performed to associate the polar radar coordinates ($\mathcal{R}$, Θ) to the display coordinates (r, θ). The radar parameter values (reflexivity, radial velocity or Doppler spectrum width) over a block of ($\mathcal{R}$, Θ) values corresponding to given (x, y) coordinates are retrieved from a radar scan line data buffer and their average or maximum value may be displayed at the given (x, y) coordinates.

Figure 1:
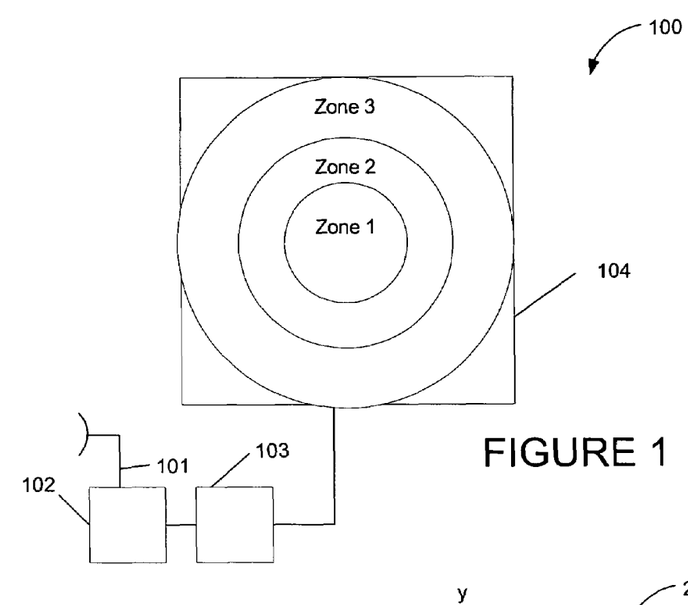
FIG. 1 illustrates a radar system that includes a plan position indicator (PPI) display in an example embodiment.

FIG. 1 illustrates a radar system 100 that includes a plan position indicator (PPI) display in an example embodiment. The radar system 100 includes an antenna 101 coupled to a radar receiver 102, a processor 103 coupled to the radar receiver 102, and a Plan Position Indicator (PPI) display 104 coupled with the processor 103. The radar antenna 101 may include a rotating transmit-and-receive antenna.

The processor 103 may receive a radar angular coordinate Θ from a drive of the scanning antenna 101 and a radar range coordinate $\mathcal{R}$ from the receiver 102. The processor may convert the radar data to (x, y) coordinates, and may provide the coordinate data (x, y), along with radar data corresponding to (x, y), to the display 104 as described herein. Radar data may include radar parameter values.

Radar video data is comprised of pixels each associated with a parameter value and indexed by radial and azimuth coordinates of the radar field. The display 104 also includes pixels, wherein each pixel may be associated with a parameter value (which may be represented by a color according to pre-assigned color scheme), and indexed by (x, y) coordinates. An echo parameter, e.g., radial data, from each range cell along a radar beam is stored sequentially in a buffer or register as the antenna 101 rotates. A radial is specified by its azimuth angle and comprises echo parameter values at radar resolution volumes corresponding to a sequence of ranges from the radar. The radar receives radial data along each azimuth angle while rotating, typically from 0° to 360° cyclically.

Due to the circular nature of the PPI display, the rotational operation of radar antenna 101, and the uniform pixel size across the display 104, three zones may be identified in the PPI display 104 as shown in FIG. 1. In Zone 1, the zone closest to the antenna, an azimuth resolution of the radar may be greater than the resolution of the display 104. A number of radar polar ($\mathcal{R}$, Θ) coordinate points map onto the same rectangular (x, y) coordinate pixel in Zone 1. In Zone 2, the middle zone, the azimuth resolution of the radar and the resolution of the display may be approximately equal. In Zone 2, a one-to-one mapping between the radar polar coordinate and the rectangular (x, y) coordinate may result. In Zone 3, the zone farthest from the antenna 101, the azimuth resolution of the radar may be poorer than the resolution of the display, and a single ($\mathcal{R}$, Θ) radar resolution cell may be mapped onto many (x, y) display pixels. The zones shown in FIG. 1 are not to scale, may not be absolute and may vary according to the display 104 (e.g., monitor) and radar resolution. A mechanism, such as an algorithm, designed for PPI display may be able to process and display data for each of the zones.

A conversion algorithm maps the radar polar coordinates ($\mathcal{R}$, Θ) to the rectangular or Cartesian coordinates (x, y) of the display. A described method calculates display polar coordinates, r and θ, as floating point values using a reverse scan conversion. Hence the display may be accurate and efficient and multiple rectangular (x, y) coordinate pixels may not map onto the same polar coordinate (r, θ). Embodiments also include an efficient mechanism or scheme for computing polar (r, θ) coordinates for each of the (x, y) coordinates.

Radar scan converters may map the radar polar coordinates ($\mathcal{R}$, Θ) to the display rectangular coordinates (x, y). Radar scan converters may help display radar data on computer monitors, and may facilitate high resolution color displays, multiple windowing, displays of different types and of different levels of data, and inclusion of text. The proposed technique may work with centered mode PPI, as well as offset mode PPI. An embodiment is capable of handling the variation of azimuth resolution at different values of the radial distance of rectangular (x, y) coordinate from the center of the display.

Figure 2:
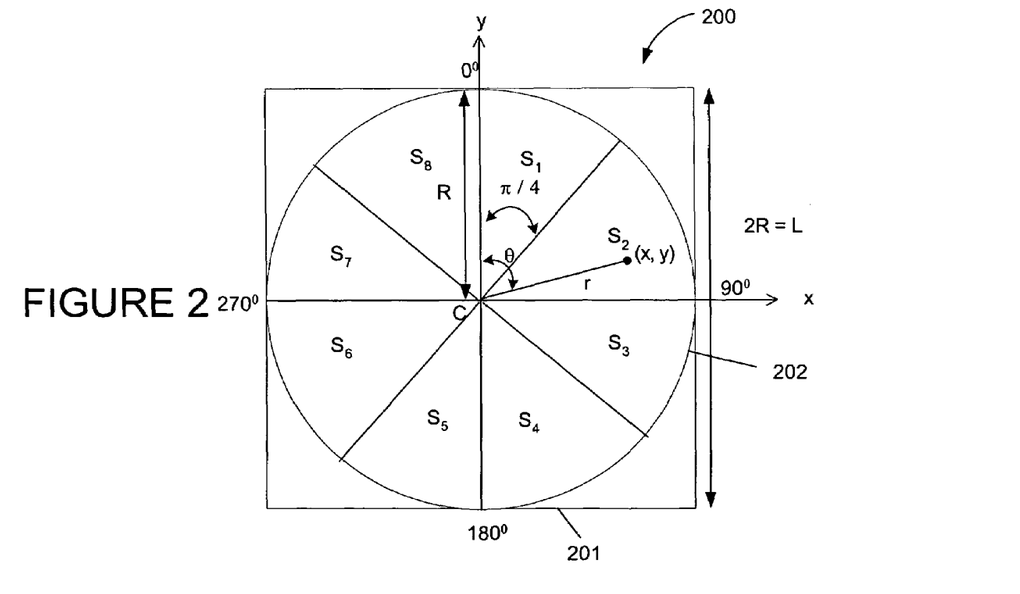
FIG. 2 illustrates a PPI with display rectangular (x, y) coordinates converted with reverse scan conversion to display polar coordinates (r, θ) according to an example embodiment.

FIG. 2 illustrates a PPI 200 with display rectangular (x, y) coordinates converted with reverse scan conversion to display polar coordinates (r, θ) according to an example embodiment. An algorithm may consider a square display area 201 with each side of length L. When the full radar scan circle is displayed in this area, a circle 202 of radius R can be fit in the display 201 as shown in FIG. 2, where R=L/2.

As shown in the example of FIG. 2, the circle 202 may be divided into 8 sectors, $S_1$ to $S_8$, of azimuth angle π/4. The algorithm computes the coordinates (r, θ) corresponding to the (x, y) coordinates over a sector $S_1$ lying between azimuth angles 0 and π/4 using equation sets (1) and (2). An (x, y) coordinate is shown to be within section $S_2$. The (x, y) coordinate may alternatively be within sector $S_1$, or any sector in which corresponding coordinates (r, θ) are computed. To cover the sector $S_1$, y is sequentially incremented by 1 pixel starting from y=0 up to y=R/√2. For each value of y, the coordinate x is varied from x=y to x=R. The (r, θ)

values are calculated for each (x, y) of this grid using equations (1) and (2) and stored in a look-up table LUT1, indexed by (x, y).

$$r=(x^2+y^2)^{1/2} \quad (1)$$

$$\theta=\tan^{-1}(x/y) \quad (2)$$

The radar scan data may be available in real time or from an archive with north as the reference direction (i.e., θ=0 at north). Any other user-specified reference for θ=0 which differs from the north by an angle $\theta_{ref}$ may be handled by adding the specified angle $\theta_{ref}$ to θ.

Figure 3:
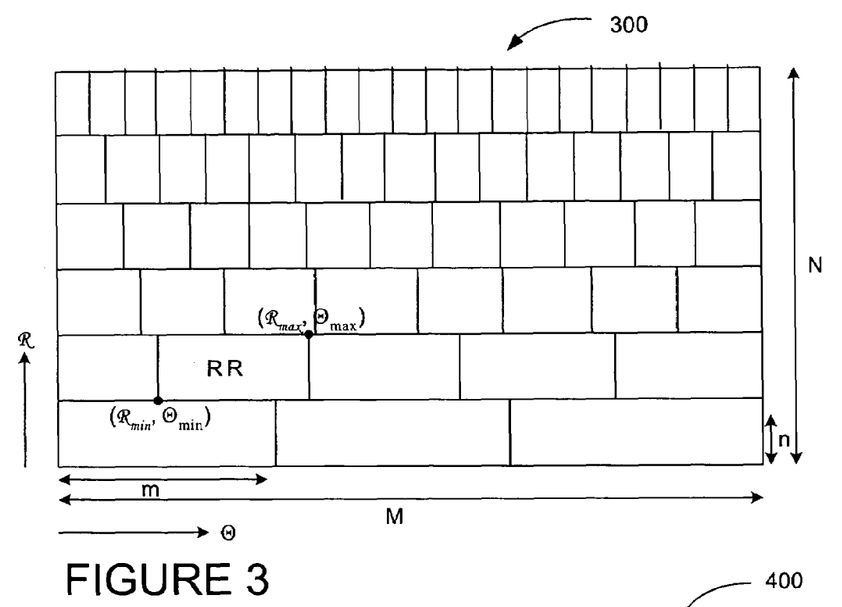
FIG. 3 illustrates a block mapping scheme for conversion of radar polar coordinates ($\mathcal{R}$, Θ) to display rectangular (x, y) coordinates according to an example embodiment.

FIG. 3 illustrates a block map system 300 for conversion of radar polar coordinates ($\mathcal{R}$, Θ) to display rectangular coordinates (x, y) according to an example embodiment. Bounds of block RR of ($\mathcal{R}$, Θ) coordinates that map to a given (x, y) coordinate may be computed. A mechanism to associate bounds of block RR in ($\mathcal{R}$, Θ) coordinates with (x, y) coordinates may be created as described herein.

FIG. 3 shows the mapping of ($\mathcal{R}$, Θ) coordinates to the (x, y) coordinates. Each block RR of the radar scan line data matrix corresponds to the limits of $\mathcal{R}$ and Θ that may map on to a single pixel located at (x, y). ($\mathcal{R}_{min}$, $\Theta_{min}$) and ($\mathcal{R}_{max}$, $\Theta_{max}$) are respectively the minimum and maximum values of ($\mathcal{R}$, Θ) in the block RR, which may be calculated using equation set (3), $\mathcal{R}_{min}$ and $\Theta_{min}$ may be rounded up and $\mathcal{R}_{max}$ and $\Theta_{max}$ may be rounded down. The (x, y) coordinates at equal radial distance r from the center of the display include the same $\mathcal{R}_{min}$ and $\mathcal{R}_{max}$. In equation set (3), θ represents an azimuth angle of (x, y) coordinate. M includes a number of radials accumulated during a sweep or radar antenna. φ is an azimuth angle interval to be displayed, including M radials. m is an angular width of RR in terms of the number of radials (Θ coordinates) that map to the (x, y) coordinates. N is a number of range cells to be displayed. R is assigned a radius of the circle that fits in the square display area, such as the display 201. n is assigned the number of range cells ($\mathcal{R}$ coordinates) that map to (x, y) coordinate Equation set (3) includes:

$$m=M/(r^*\phi);\ n=N/R$$

$$\Theta_{min}=(\theta/\phi)^*(M);\ \Theta_{max}=\Theta_{min}+m$$

$$\mathcal{R}_{min}=r^*n;\ \mathcal{R}_{max}=\mathcal{R}_{min}+n$$

Equation set (3) may be applied to all points (x, y) in sector $S_1$. Corresponding values $\mathcal{R}_{min}$,$\Theta_{min}$), $\mathcal{R}_{max}$ and m may be stored in a mechanism called LUT2. The mechanism may be selected from a look-up table (LUT) indexed by (x, y) coordinates, an algorithm, a graph, and an equation. The LUT may be implemented as a two-dimensional array indexed by (x, y) coordinates. The memory that may be used for storing the parameters of the rectangular region may be minimal.

For a pixel in any of the sectors $S_2$ through $S_8$, its mapping pixel in Sector $S_1$ may be obtained by replacing the indices x and y with the quantities given in the Rule Set (1) and the corresponding values ($\mathcal{R}_{min}$,$\Theta_{min}$), $\mathcal{R}_{max}$ and m, read from LUT2, following which $\Theta_{min}$ is further modified according to Rule Set (2). $\Theta_{max}$ for the given pixel (x, y) is calculated from equation set (3) by using the corresponding values of $\Theta_{min}$ and m.

Rule Set (1)

| Sector No. | Replace x with: | Replace y with: |
|---|---|---|
| $S_2$ | Y | x |
| $S_3$ | -y | x |
| $S_4$ | X | -y |
| $S_5$ | -x | -y |
| $S_6$ | -y | -x |
| $S_7$ | Y | -x |
| $S_8$ | -x | y |

Rule Set (2)
Computation of $\Theta_{min}$

| Sector No. | Subtract from | Add to |
|---|---|---|
| $S_2$ | $(\pi/2)*(M/\phi)$ | |
| $S_3$ | | $(\pi/2)*(M/\phi)$ |
| $S_4$ | $\pi*(M/\phi)$ | |
| $S_5$ | | $\pi*(M/\phi)$ |
| $S_6$ | $(3\pi/2)*(M/\phi)$ | |
| $S_7$ | | $(3\pi/2)*(M/\phi)$ |
| $S_8$ | $(2\pi)*(M/\phi)$ | |

The parameters of the block RR may be calculated based upon radials accumulated during a sweep of radar antenna 101, an azimuth angle $\phi$ encompassing the radials, the computed (r, $\theta$) coordinates, the radius of the circle R that fits within the display, and range cells of radar data. The radials and the range cells may be dimensions of the radar data.

A user-specified display magnification may be handled by multiplying R in equation set (3) with the scale factor in proportion to the magnification specified. R is shown in FIG. 2. In an embodiment, (x, y) coordinates do not have to be transformed to the scaled coordinates. Floating point values $\mathcal{R}_{min}$, $\mathcal{R}_{max}$, $\Theta_{min}$, and $\Theta_{max}$ may be converted to integer values for indexing the radar data. $\mathcal{R}_{min}$ and $\Theta_{min}$ may be rounded up to the nearest integers while $\mathcal{R}_{max}$ and $\Theta_{max}$ may be rounded down to the nearest integers.

A user-specified offset ($x_{off}$, $y_{off}$) of the center of the display, i.e., radar location, may be handled by adding (or subtracting) $x_{off}$ and $y_{off}$ to (from) the original display coordinates x and y respectively before performing the display computations.

Any combination of offset, magnification, and rotation may be handled by the example embodiment by sequential application of the three transformations.

A method may automatically calculate the offset and magnification factor used to fit a user-specified sector of radar data bounded by ($\Theta_{start}$, $\Theta_{end}$) and ($R_{start}$, $R_{end}$) to a specified display rectangle.

Figure 4:
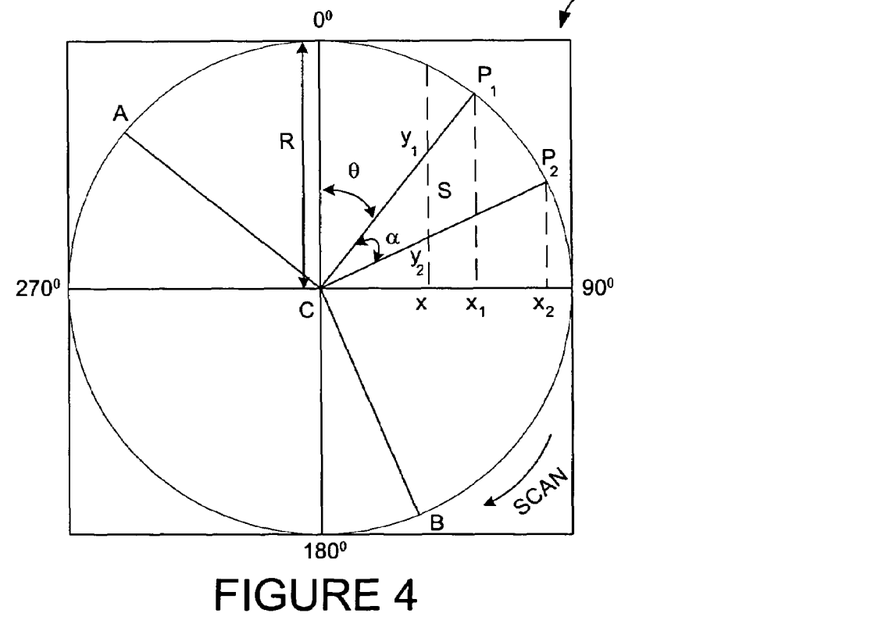
FIG. 4 illustrates a plan position indicator (PPI) with display rectangular (x, y) coordinates for a general sector according to an example embodiment.

FIG. 4 illustrates a plan position indicator (PPI) 400 with display rectangular (x, y) coordinates. The point C is the center of the display. The radials CA and CB denote the bounds of the sector of radar scanning to be displayed, termed the "display sector", which may cover the entire interval 0 to $2\pi$ (i.e., 0 to 360°) implying a full-circular scan. The display data are constituted at a time over a smaller sector S of angular width $\alpha$, called the "sweep sector" and bounded by the radii $CP_1$ and $CP_2$, according to an example embodiment. The radar data at (x, y) coordinates in each of the sweep sectors are displayed sequentially from the beginning to the end of the display sector.

The method of constituting the display data over a sweep sector at a time may be used to display either stored or real time data. The sweep sector width $\alpha$ may be user-specified. Large values of $\alpha$ may reduce the computational steps, but may result in a lag of the display with respect to the real-time radar scan, and may render a jumpy look to the display. Smaller values of $\alpha$ may result in a smoother progress of the display update, but at the expense of higher computation. The display processing starts with the radius $CP_1$ coinciding with CA and terminates with the radius $CP_2$ coinciding with CB. The display may be refreshed as the radar receiver receives refresh radial data.

The radial data from each of the range cells along the radar beam is stored sequentially in a buffer (register) as the antenna rotates. The radial data is buffered until each of the (x, y) coordinates in a sweep sector can be displayed and this is repeated until each of the sweep sectors may be displayed. Buffering may avoid the drawback of redrawing the same (x, y) coordinate many times. In an embodiment, the displayed image is updated following a rotation of antenna 101 with minimal latency. None of the (x, y) coordinates may be redrawn because the technique may be implemented using the reverse scan conversion.

The (x, y) coordinates in a sweep sector S may be displayed. The x-coordinates, $x_1$ and $x_2$, of $P_1$ and $P_2$ respectively, may be calculated using equation set (4).

$$x_1 = (R)*(\sin(\theta))$$
$$x_2 = (R)*(\sin(\theta+\alpha)) \qquad (4)$$

While the sweep sector scans over the display sector, the sweep sector may lay either entirely in one of the four quadrants of the display or it may straddle two of the adjacent quadrants. If the sweep sector lies entirely in any of the four quadrants, then the higher of the two values $x_1$ and $x_2$ is labeled $x_{max}$ and the lower one is labeled $x_{min}$. If the sector wholly lies in the first or the second quadrant, the x-coordinate for each pixel included in the sector lies in [0, $x_{max}$]. The x-coordinate lies in [$x_{min}$, 0] if the sector lies wholly in the third or the fourth quadrant.

The bounds of y-coordinate, $y_1$ and $y_2$, for each x may be calculated as described in the following. If the x-coordinate lies between [$x_1$, $x_2$] or [$x_2$, $x_1$], then $y_1$ is assigned $(R^2-x^2)^{1/2}$ if the sector lies in the first or fourth quadrants and $y_2$ is calculated using equation (5). If the sector lies in the second or third quadrants then $y_2$ is assigned $-(R^2-x^2)^{1/2}$ and $y_1$ is calculated from equation (6). For x-coordinate values outside these intervals, both $y_1$ and $y_2$ are calculated using equations (6) and (5) respectively. After computing $y_1$ and $y_2$, the maximum of $y_1$ and $y_2$ is assigned to $y_{max}$ and the minimum is assigned to $y_{min}$.

$$y_2 = x*(\cot(\theta+\alpha)) \qquad (5)$$

$$y_1 = x*(\cot(\theta)) \qquad (6)$$

However, the process described with regard to FIG. 4 does not handle cases where the sweep sector straddles two adjacent quadrants, i.e., the sweep sector includes one of the radials along 0, $\pi/2$, $\pi$ and $3\pi/2$. FIGS. 5, 6, 7, and 8, respectively, handle the sectors that include $\pi$, 0, $\pi/2$, and $3\pi/2$.

Figure 5:
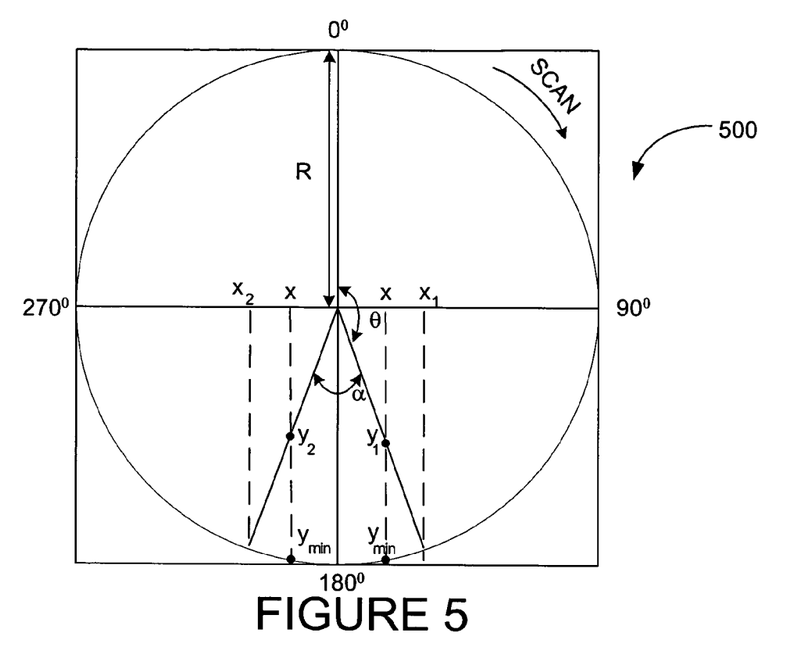
FIG. 5 illustrates a plan position indicator (PPI) with display rectangular (x, y) coordinates for a sector including 180° according to an example embodiment.

FIG. 5 illustrates a plan position indicator (PPI) 500 with display rectangular (x, y) coordinates for a sweep sector including the radial along $\pi$ radians (i.e., 180°) according to an example embodiment. The x-coordinate lies in [$x_2$, $x_1$], where $x_1$ and $x_2$ may be calculated using equation set (4).

For negative x, (i.e., x lying in $[x_2, 0]$), the y-coordinate lies in $[y_{min}, y_2]$ where $y_2$ is calculated using equation (5). For positive x (i.e., x lying in $[0, x_1]$), y lies in $[y_{min}, y_1]$ where $y_1$ is calculated using equation (6). In both cases, $y_{min}$ is assigned the value $-(R^2-x^2)^{1/2}$.

Figure 6:
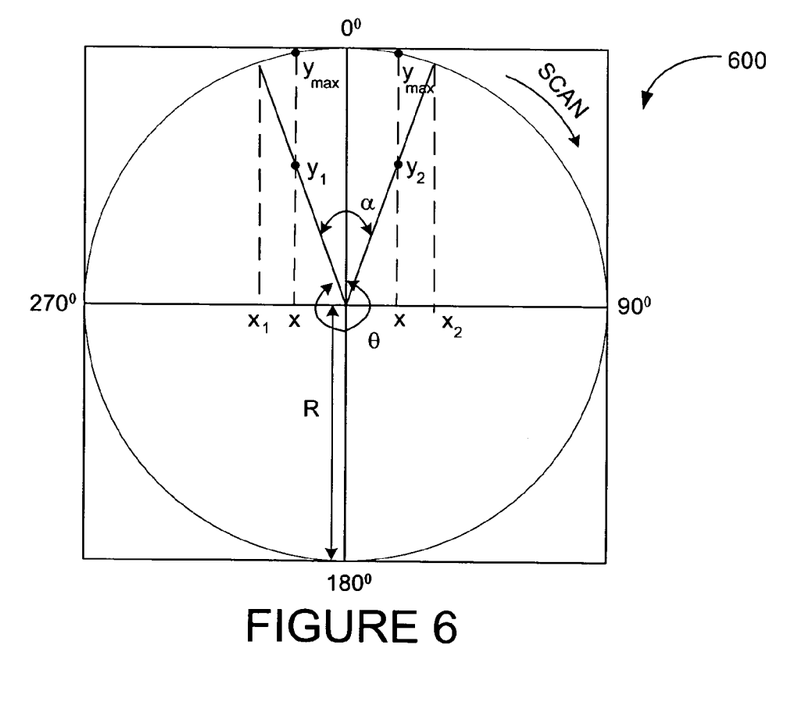
FIG. 6 illustrates a plan position indicator (PPI) with display rectangular (x, y) coordinates for a sector including 0° according to an example embodiment.

FIG. 6 illustrates a plan position indicator (PPI) 600 with display rectangular (x, y) coordinates for a sector including the radial along 0 radians (also 0°) according to an example embodiment. The x-coordinate lies in $[x_1, x_2]$; where $x_1$ and $x_2$ may be calculated using equation set (4). For x-coordinate in $[x_1, 0]$, the y-coordinate lies in $[y_1, y_{max}]$ where $y_1$ is calculated using equation (6). If the x-coordinate lies in $[0, x_2]$, the y-coordinate lies in $[y_2, y_{max}]$ where $y_2$ is calculated using equation (5). In both cases, $y_{max}$ is assigned the value $(R^2-x^2)^{1/2}$.

Figure 7:
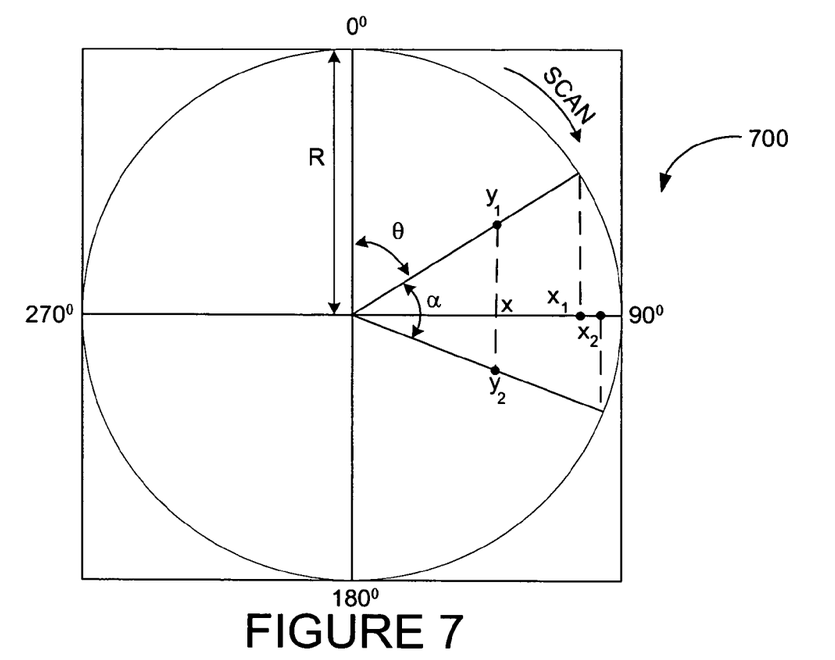
FIG. 7 illustrates a plan position indicator (PPI) with display rectangular (x, y) coordinates for a sector including 90° according to an example embodiment.

FIG. 7 illustrates a plan position indicator (PPI) 700 with display rectangular (x, y) coordinates for a sector including the radial along $\pi/2$ radians (i.e., 90°) according to an example embodiment. The x-coordinate for pixels in this sector lies in $[0, R]$. $x_1$ and $x_2$ may be calculated using equation set (4). For $x<\min(x_1,x_2)$, the bounds of y-coordinate for each x-coordinate $y_1$ and $y_2$, may be calculated using equations (6) and (5) respectively. If $x_1 \leq x \leq x_2$, then $y_1$ is assigned $(R^2-x^2)^{1/2}$ and $y_2$ is as obtained from equation (5). If $x_2 \leq x \leq x_1$, then $y_2$ is assigned $-(R^2-x^2)^{1/2}$ and $y_1$ is as obtained from equation (6). If $x>\max(x_1, x_2)$, then $y_1$ is assigned $(R^2-x^2)^{1/2}$ and $y_2$ is assigned $-(R^2-x^2)^{1/2}$.

Figure 8:
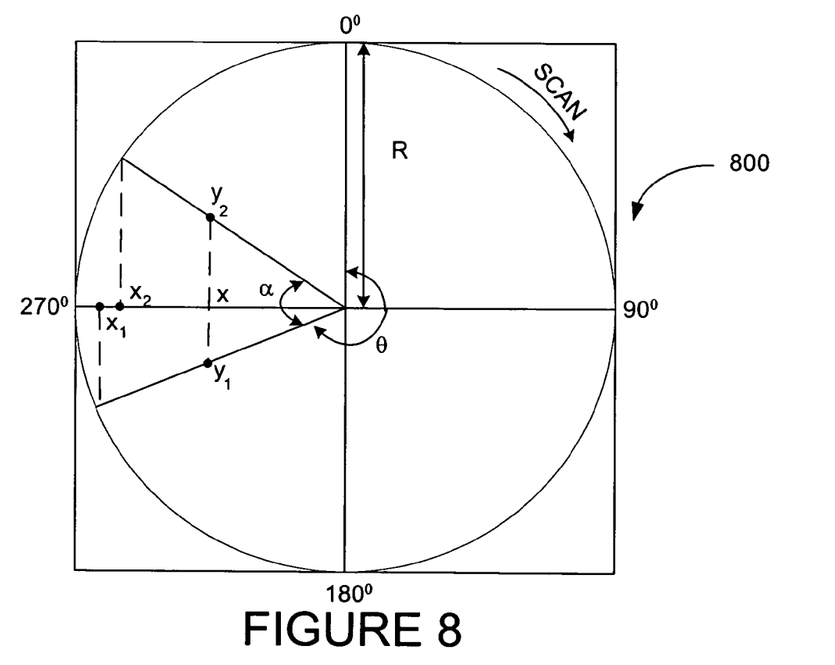
FIG. 8 illustrates a plan position indicator (PPI) with display rectangular (x, y) coordinates for a sector including 270° according to an example embodiment.

FIG. 8 illustrates a plan position indicator (PPI) 800 with display rectangular (x, y) coordinates for a sector including the radial along $3\pi/2$ radians (i.e., 270°) according to an example embodiment. The x-coordinate for pixels in this sector lies in $[-R, 0]$. $x_1$ and $x_2$ may be calculated using equation set (4). For $x>\max(x_1,x_2)$, the bounds of y-coordinate for each x-coordinate, $y_1$ and $y_2$, may be calculated using equations (6) and (5), respectively. If $x_1 \leq x \leq x_2$, then $y_2$ is assigned $(R^2-x^2)^{1/2}$ and $y_1$ is as obtained from equation (6). If $x_2 \leq x \leq x_1$, then $y_1$ is assigned $-(R^2-x^2)^{1/2}$ and $y_2$ is as obtained from equation (5). If $x<\min(x_1,x_2)$, the $y_1$ is assigned $-(R^2-x^2)^{1/2}$ and $y_2$ is assigned $(R^2-x^2)^{1/2}$.

Figure 9:
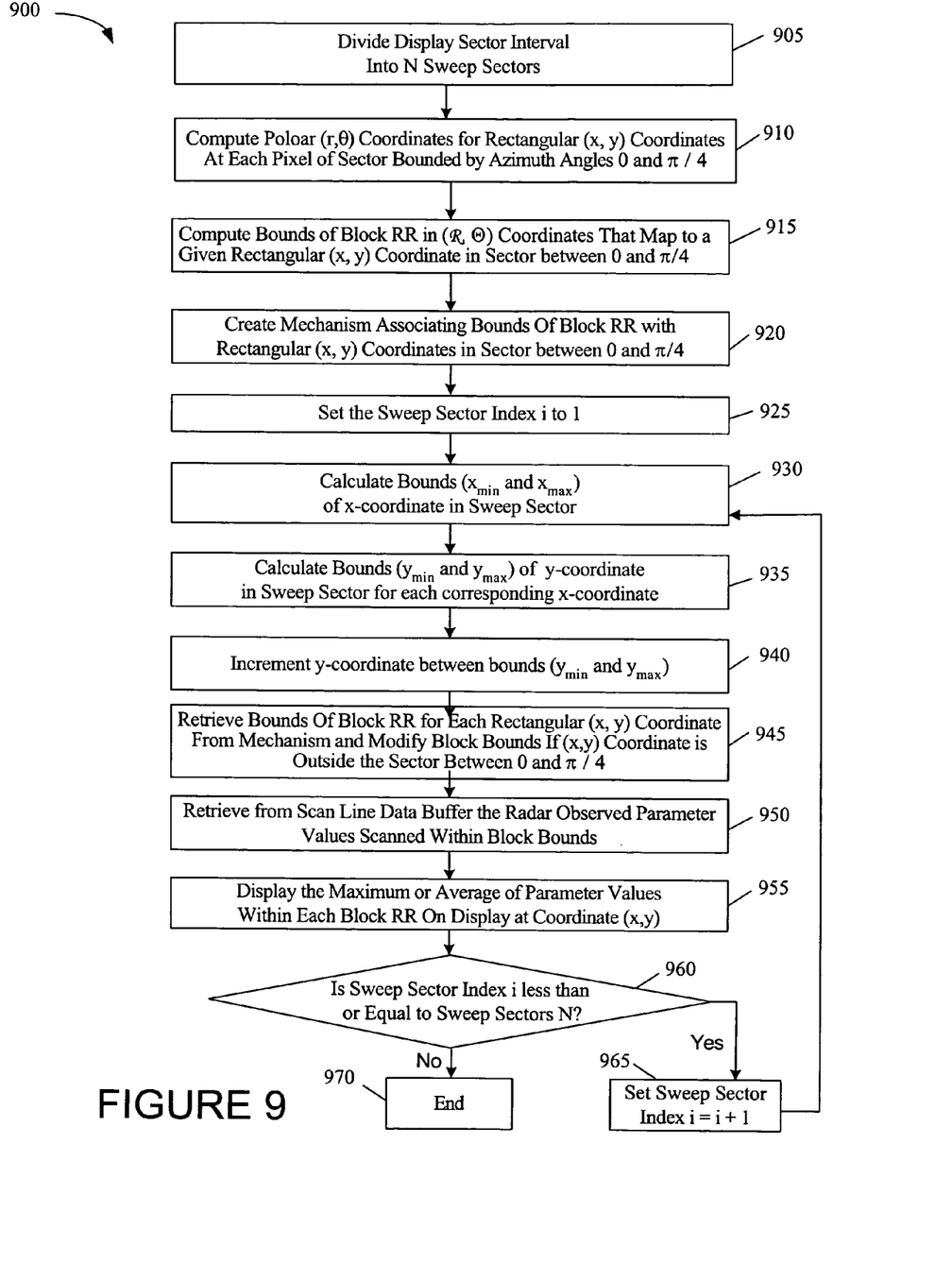
FIG. 9 illustrates a display process according to an example embodiment.

FIG. 9 illustrates a display process 900 according to an example embodiment.

At block 905, a display sector may be divided into N sweep sectors.

At block 910, $(r, \theta)$ coordinates of the display may be computed for (x, y) coordinates at each pixel within the sector bounded by azimuth angles 0 and $\pi/4$. If the azimuthal extent of the display sector is $\pi/4$ or less than $(r,\theta)$ coordinates of the display may be computed for the entire sector.

At block 915, bounds of block RR of $(\mathcal{R}, \Theta)$ coordinates that map to a given (x, y) coordinate pixel in the sector between 0 and $\pi/4$ may be computed using equation set (3). The bounds in radar coordinates may be $(\mathcal{R}_{min}, \Theta_{min})$ and $(\mathcal{R}_{max}, \Theta_{max})$, and may be computed for each (x, y) coordinate in the sector.

At block 920, a mechanism may be created to associate the bounds $(\mathcal{R}_{min}, \Theta_{min})$ and $\mathcal{R}_{max}$, as well as the angular width m of block RR in $(\mathcal{R}, \Theta)$ coordinates, with the (x, y) coordinates in the sector between azimuth angles 0 and $\pi/4$. For example, a Look Up Table of the bounds and angular width of block RR in $(\mathcal{R}, \Theta)$ coordinates, indexed by (x, y) coordinates, may be created.

At block 925, a sweep sector index i is set to 1.

At block 930, bounds ($x_{min}$ and $x_{max}$) of the x-coordinate in the sweep sector i may be calculated. For the $i^{th}$ sweep sector, bounds associated with the x-coordinate in the sector may be calculated as described with regard to FIGS. 4-8.

At block 935, bounds ($y_{min}$ and $y_{max}$) of the y-coordinate in the sweep sector i may be calculated for each x-coordinate. The x-coordinate may be incremented in steps of 1 unit between the bounds $x_{min}$ and $x_{max}$. Bounds on the y-coordinate associated with each x-coordinate may be calculated as described with regard to FIGS. 4-8.

At block 940, the y-coordinate may be incremented in steps of 1 unit between the bounds $y_{min}$ and $y_{max}$.

At block 945, bounds of block RR for each (x, y) coordinate may be retrieved from the mechanism and the block bounds $(\mathcal{R}_{min}, \Theta_{min})$ and $(\mathcal{R}_{max}, \Theta_{max})$ may be modified accordingly. The bounds and angular width of block RR for each (x, y) coordinate may be retrieved from LUT2. $\Theta_{min}$ may be further modified according to Rule Set (2). $\Theta_{max}$, for the given pixel (x, y) may be calculated from equation set (3) by using the corresponding values of $\Theta_{min}$ and m.

At block 950, radar observed parameter values scanned within the corresponding retrieved bounds of block RR may be retrieved from the buffer or storage medium (called "scan line data buffer" and containing the radar data). Radar parameter values may include reflectivity. Doppler velocity, and Doppler spectrum width. Parameter values, e.g., radar scan data or intensity values, may be scanned within the corresponding block bounds. For example, intensity values for corresponding block bounds may be retrieved from the radar buffer.

Figure 10:
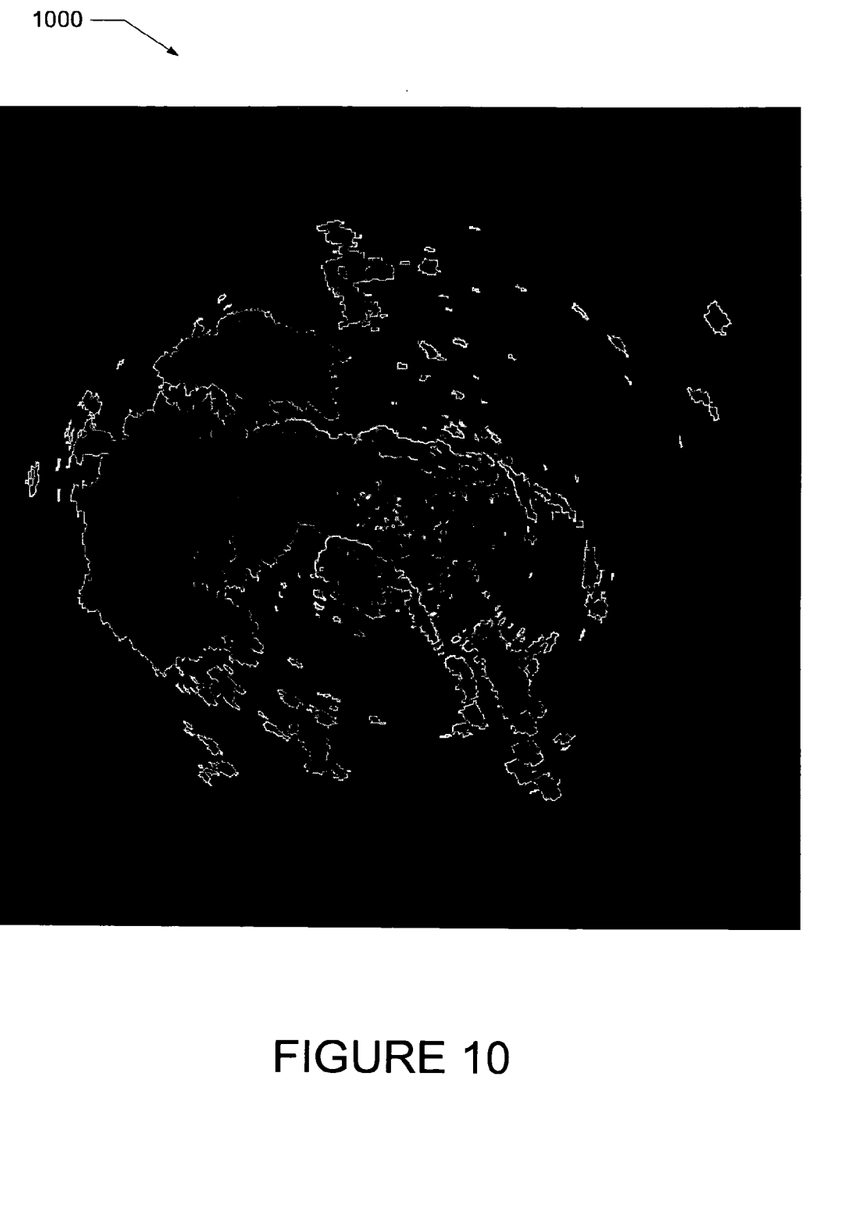
FIG. 10 illustrates a sample PPI display with applied algorithms according to an example embodiment.

At block 955, parameter values within each block RR may be displayed at the pixel (x, y) as shown in FIG. 10. In one embodiment, the average of the intensity values within each block, having bounds $(\mathcal{R}_{min}, \Theta_{min})$ and $(\mathcal{R}_{max}, \Theta_{max})$, may be displayed. In another embodiment, the maximum of the intensity values within each block, having bounds $(R_{min}, \Theta_{min})$ and $(\mathcal{R}_{max}, \Theta_{max})$ may be displayed. The corresponding average or maximum intensity value at each corresponding (x, y) coordinate may be displayed in the display of FIG. 10.

At operation 960, a determination is made as to whether the sweep sector index i is less than the number of sweep sectors N. If the sector index i is less than the number of sweep sectors N, the sector index i is set to i+1 at block 965, and the process returns to block 930. If the sector index i is equal to (or greater than) the number of sweep sectors N, the process proceeds to block 970, which ends the process.

FIG. 10 illustrates a PPI 1000 with applied algorithms according to an example embodiment. The result of applying the algorithm to reflectivity data of, for example, NEXRAD, may be illustrated in FIG. 10. FIG. 10 may illustrate a PPI on a cathode ray tube monitor and/or a liquid crystal display monitor. Running a software program on the processor that receives data from the radar receiver in real time may generate the illustrated sweeping display.

In the display 1000, the intensity values may be displayed in color. The display may be of any resolution.

In an embodiment, holes and spokes may be minimized in the displayed image of FIG. 10 using the embodiment described herein. In an embodiment, target shapes may be substantially preserved on the display at various range scales.

Embodiments herein may include offset mode PPI and/or centered mode PPI as a special case of the offset mode PPI with the offset being (0,0). Hence embodiments may be used for both offset and centered modes without additional programming.

Multiple elevation angles may be displayed simultaneously on the display 1000. For example, multiple PPIs of different elevation angles may be displayed simultaneously in different display areas, which may be square.

Pre-recorded radar data available from public or private data archives may be displayed in display 1000.

The display coordinates may be adjusted to the predetermined resolution while minimizing computational overhead. An embodiment of a method described herein determines display coordinates of a radar scan adjusted to a display resolution and to a radar resolution.

The process may include recomputing the mechanism, e.g., a Look Up Table (LUT), when at least one of a resolution of the display changes and a dimension of the radar data changes. Because the resolution parameters of the radar and display may be less likely to change, the LUT can be computed at the time of initialization or whenever the display (radar) data dimensions change. In case the changes may be frequent, multiple LUTs may be computed and stored for each of the offset and centered modes. The use of LUTs enables a high performance with minimal memory and computational overhead, wherein memory may be less expensive as compared to the increase of the processing speed of hardware. In cases where the processing speed may be less expensive than the memory, equations or another mechanism such as software programming applications, for example, may be used in lieu of look up tables.

Figure 11:
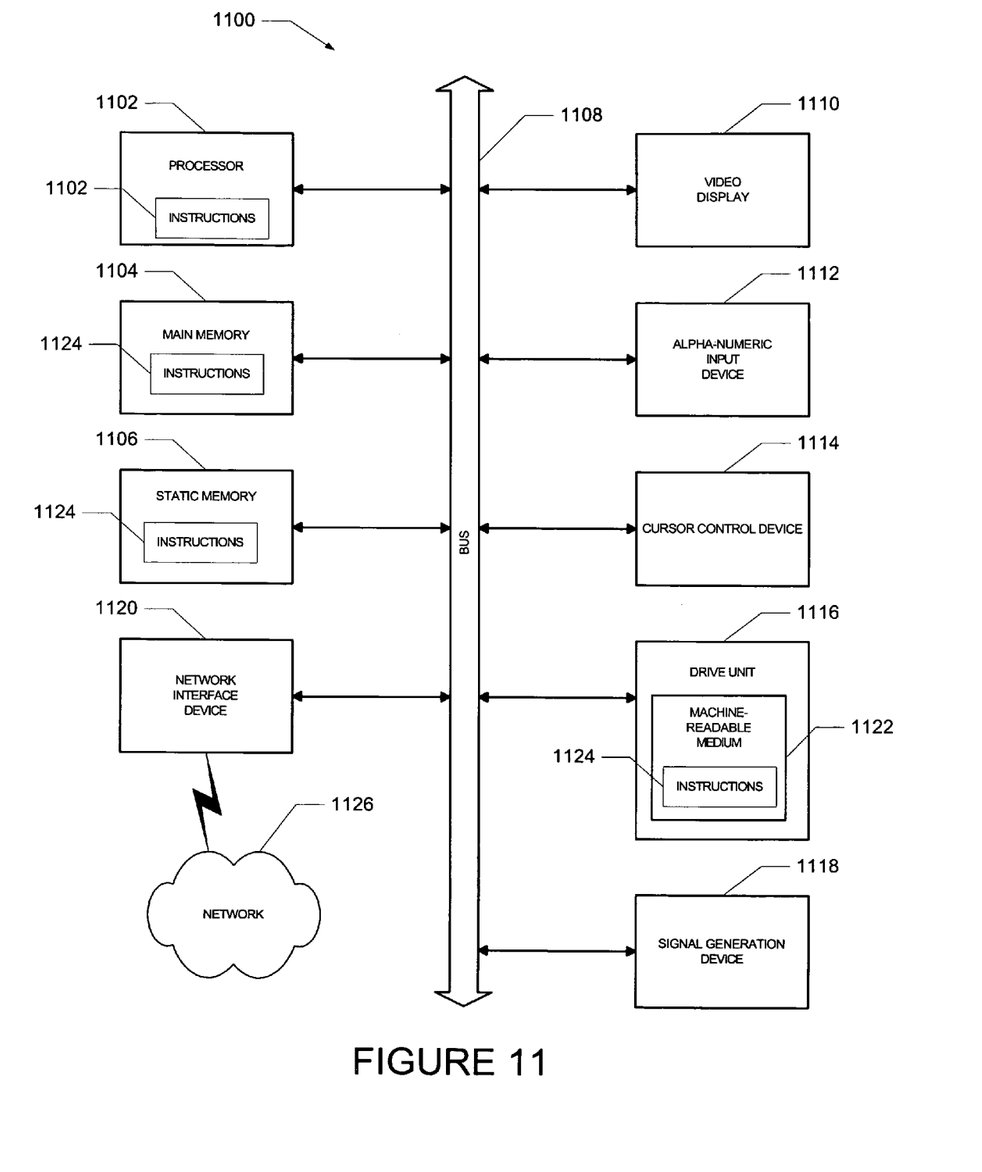
FIG. 11 shows a diagrammatic representation of a machine in the form of a computer system within which a set of instructions, for causing the machine to perform any one or more of the methodologies discussed herein, may be executed, according to an example embodiment.

FIG. 11 shows a diagrammatic representation of a machine in the example form of a computer system 1100 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a mobile device, a palmtop computer, a laptop computer, a desktop computer, a control system, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processor 1102 (e.g., a central processing unit (CPU), a graphics processing unit (GPU), or both), a main memory 1104 and a static memory 1106, which communicate with each other via a bus 1108. The computer system 1100 may further include a video display unit 1110 (e.g., a liquid crystal display (LCD) or a cathode ray tube (CRT). The computer system 1100 also includes an input device 1112 (e.g., a keyboard), a cursor control device 1114 (e.g., a mouse), a disk drive unit 1116, a signal generation device 1118 (e.g., a speaker) and a network interface device 1120.

The disk drive unit 1116 includes a machine-readable medium 1122 on which is stored one or more sets of instructions (e.g., software 1124) embodying any one or more of the methodologies or functions described herein. The instructions 1124 may also reside, completely or at least partially, within the main memory 1104, the static memory 1106, and/or within the processor 1102 during execution thereof by the computer system 1100. The main memory 1104 and the processor 1102 also may constitute machine-readable media.

The instructions 1124 may further be transmitted or received over a network 1126 via the network interface device 1120.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

Embodiments of the process described may be implemented on a Digital Signal Processing (DSP) chip or any other computer board. The process may be implemented in a high level programming language for ease of coding, though it may also be implemented in other types of programming languages, e.g., in assembly or machine languages to achieve higher processing speed and reduced memory overheads. An algorithm of the process may be embedded in hardware for real-time display of data from radar receiver.

While the machine-readable medium 1122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

The machine-readable medium used may handle any user-specified rotation, zooming into a specified region of the display, magnification of the display, range interval selected for the display, and sector selection. The medium may handle viewing a selected sector in the display. The selected sector may include a selected quadrant in the display.

GENERAL DESCRIPTION

Embodiments described herein may be used with the presentation and display of radar data by users such as meteorologists, air traffic controllers, pilots, TV weather broadcasters, and disaster monitors. Embodiments may be used by entities working on general radars, weather radars, imaging radars, meteorological data products and PPI displays.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. FIGS. 1 to 11 are merely representational and may not be drawn to scale. Certain proportions thereof may be exaggerated, while others may be minimized. Accordingly, the specification and drawings are to be regarded in an illustrative rather than a restrictive sense.

The following description includes terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to comply with 37 C.F.R. §1.74(b) to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus the following claims are hereby incorporated into the Detailed Description, with each claim standing on its own as a separate embodiment.

Thus, a method and system to display radar parameter values on a PPI display have been described. Although embodiments of the present invention have been described with reference to specific example embodiments, it will be evident that various modifications and changes may be made to these embodiments without departing from the broader spirit and scope of embodiments as expressed in the subjoined claims.

The invention claimed is:

1. A method to display coordinates of radar scan data comprising:
dividing an angular display interval into at least one sweep sector;
computing polar $(r, \theta)$ coordinates for rectangular $(x, y)$ coordinates at each pixel of the angular display interval;
computing bounds and angular width of a block of polar radar $(R, \Theta)$ coordinates that map to a given pixel of the rectangular $(x, y)$ coordinates;
creating a mechanism to associate the bounds of the block in polar radar $(R, \Theta)$ coordinates with the rectangular $(x, y)$ coordinates;
calculating bounds associated with an x-coordinate of the given pixel in a first sweep sector of the at least one sweep sector;
assigning a maximum of the calculated x-coordinate bounds to $x_{max}$ and a minimum to $x_{min}$;
calculating bounds associated with a y-coordinate of the given pixel for each x-coordinate in the first sweep sector;
assigning a maximum of the calculated bounds of the y-coordinate to $y_{max}$ and a minimum to $y_{min}$;
retrieving the bounds and the angular width of the block of polar radar $(R, \Theta)$ coordinates for each rectangular $(x, y)$ coordinate from the mechanism;
retrieving observed radar parameter values scanned within the corresponding retrieved block bounds; and
displaying the parameter values within the block on a display.

2. The method of claim 1, wherein the polar $(r, \theta)$ coordinates, and the bounds and the angular width of the block of polar radar $(R, \Theta)$ coordinates that map to the given pixel, are calculated for the angular display interval between 0 and $\pi/4$, and the bounds of the block of polar radar $(R, \Theta)$ coordinates that map to rectangular $(x, y)$ coordinate values in other parts of the angular display interval are calculated from corresponding $(x, y)$ coordinates within the angular display interval between 0 and $\pi/4$.

3. The method of claim 1 wherein the mechanism includes a look up table of the bounds of the angular width of the block in polar radar $(R, \Theta)$ coordinates indexed by the $(x, y)$ coordinates.

4. The method of claim 1 further comprising calculating an average of the parameter values within the block and displaying the average parameter values at each corresponding $(x, y)$ coordinate.

5. The method of claim 1 further comprising calculating a maximum of the parameter values within the block and displaying the maximum parameter values at each corresponding $(x, y)$ coordinate.

6. The method of claim 1 wherein the radar parameter values are selected from reflectivity, Doppler velocity, Doppler spectrum width, and other imaging or mapping radar parameters.

7. The method of claim 1 wherein the mechanism is selected from a look-up table, an algorithm, a graph, and an equation.

8. The method of claim 1 further comprising displaying the radar parameter values at the $(x, y)$ coordinates in the sectors sequentially from 0 to $2\square$.

9. The method of claim 1 further comprising displaying radar parameter values at the $(x, y)$ coordinates in the sectors sequentially for any azimuth $\theta_{start}$ to any other azimuth $\theta_{end}$.

10. The method of claim 1 wherein the azimuth angular width of divided sectors is determined by specified smoothness of a display process.

11. The method of claim 1 further comprising determining a range to increment x and computing the bounds associated with the y-coordinate at each incremental x value.

12. The method of claim 11 further comprising determining the range in which to increment x based on a quadrant of the specified sector and the angular bounds associated with the sector.

13. The method of claim 1 wherein the block includes bounds $(R_{min}, \Theta_{min})$ and $(R_{max}, \Theta_{max})$, wherein $R_{min}$ and $\Theta_{min}$ are rounded up to the nearest integers while $R_{max}$ and $\Theta_{max}$ are rounded down to nearest integers.

14. The method of claim 13 wherein computing $(R_{min}, \Theta_{min})$ and $(R_{max}, \Theta_{max})$ for $(x, y)$ coordinates at each pixel uses a formula that depends upon a quadrant in which the $(x, y)$ coordinate value lies.

15. The method of claim 1 wherein the radar parameter values are displayed in color.

16. A computer-readable media having instructions stored thereon for causing a system to perform a method to display coordinates of radar scan data, the method comprising:
dividing an angular display interval into at least one sweep sector;
computing polar $(r, \theta)$ coordinates for rectangular $(x, y)$ coordinates at each pixel of the angular display interval;
computing bounds and angular width of a block of polar radar $(R, \Theta)$ coordinates that map to a given pixel of the rectangular $(x, y)$ coordinates;

creating a mechanism to associate the bounds of the block in polar radar (R, Θ) coordinates with the rectangular (x, y) coordinates;

calculating bounds associated with an x-coordinate of the given pixel in a first sweep sector of the at least one sweep sector;

assigning a maximum of the calculated x-coordinate bounds to $x_{max}$ and a minimum to $x_{min}$;

calculating bounds associated with a y-coordinate of the given pixel for each x-coordinate in the first sweep sector;

assigning a maximum of the calculated bounds of the y-coordinate to $y_{max}$ and a minimum to $y_{min}$;

retrieving the bounds and the angular width of the block of polar radar (R, Θ) coordinates for each rectangular (x, y) coordinate from the mechanism;

retrieving observed radar parameter values scanned within the corresponding retrieved block bounds; and displaying the parameter values within the block on a display.

17. The media of claim 16 wherein the bounds of the block are calculated based upon beginning and ending azimuth angles of the display interval, a number of radials accumulated during a sweep of radar antenna between these angles, the computed polar (r,θcoordinates, a radius of a display circle, and range cell indices of closest and farthest radar ranges of the display.

18. The media of claim 17 wherein data corresponding to the radar antenna sweep is determined in one of a centered mode and an offset mode.

19. The media of claim 16 further comprising:
buffering radial data for the first sweep sector of the at least one sector until each (x, y) coordinate in the first sweep sector is displayed;
repeating buffering for each of the remaining sweep sectors sequentially; and
displaying the measured parameter values at the (x, y) coordinates in each of the sweep sectors sequentially within the display interval.

20. An algorithm to convert radar scan data to (x, y) coordinates of a display comprising:
means for dividing an angular display interval into at least one sweep sector;
means for computing polar (r, θ) coordinates for rectangular (x, y) coordinates at each pixel of the angular display interval;
means for computing bounds and angular width of a block of polar radar (r, Θ) coordinates that map to a given pixel (x, y) of the rectangular (x, y) coordinates;
means for creating a mechanism to associate the bounds of the block in polar radar (R, Θ) coordinates with the rectangular (x, y) coordinates;
means for calculating bounds associated with an x-coordinate of the given pixel in a sweep sector of the at least one sweep sector;
means for assigning a maximum of the calculated x-coordinate bounds to $x_{max}$ and a minimum to $x_{min}$;
means for calculating bounds associated with a y-coordinate of the given pixel for each x-coordinate in the sweep sector;
means for assigning a maximum of the calculated bounds of the y-coordinate to $y_{max}$ and a minimum to $y_{min}$;
means for retrieving the bounds and the angular width of the block of polar radar (r, Θ) coordinates for each rectangular (x, y) coordinate from the mechanism;
means for retrieving observed radar parameter values scanned within the corresponding retrieved block bounds; and
means for displaying parameter values within the block on a display.

21. The algorithm of claim 20 further comprising means for handling off-centered displays.

22. The algorithm of claim 20 further comprising means for magnifying the display.

23. The algorithm of claim 20 further comprising means for zooming into a specified region of the display.

24. The algorithm of claim 20 further comprising means for selecting a range interval for the display.

25. The algorithm of claim 20 further comprising means for viewing a selected sector in the display.

26. The algorithm of claim 20 further comprising means for displaying pre-recorded parameter values available from a selection including public data archives and private data archives.

27. The algorithm of claim 20 wherein the block bounds are calculated based on a parameter values dimension, the algorithm further comprising means for recomputing the mechanism when at least one of a resolution of the display changes and the dimension of the parameter values changes.

28. The algorithm of claim 20 further comprising means for selecting an azimuth angular width of a radar sweep sector depending on a specified smoothness.

29. The algorithm of claim 20 further comprising means for computing the mechanism for at at least one of an offset plan position indicator mode and a centered plan position indicator mode.

* * * * *